(12) United States Patent
Pankratz et al.

(10) Patent No.: US 10,864,962 B2
(45) Date of Patent: Dec. 15, 2020

(54) ELECTRONIC THROTTLE CONTROL ASSEMBLY

(71) Applicant: Sensata Technologies, Inc., Attleboro, MA (US)

(72) Inventors: Mark Allen Pankratz, Bloomington, MN (US); Edmund Charles O'Neill, Victoria, MN (US); Joshua Gayle Boltz, Howard Lake, MN (US); Paul Robert Erickson, Prior Lake, MN (US); Andrew Reid Daavettila, Delano, MN (US); Jeremiah Thomas Rau, Elko-New Market, MN (US); Gerald Scherbing, Minneapolis, MN (US)

(73) Assignee: Sensata Technologies, Inc., Attleboro, MA (US)

(*) Notice: Subject to any disclaimer, the term of this patent is extended or adjusted under 35 U.S.C. 154(b) by 160 days.

(21) Appl. No.: 16/001,668

(22) Filed: Jun. 6, 2018

(65) Prior Publication Data

US 2019/0375480 A1   Dec. 12, 2019

(51) Int. Cl.
| | | |
|---|---|---|
| *B62K 23/04* | (2006.01) | |
| *B62K 23/06* | (2006.01) | |
| *B62M 25/04* | (2006.01) | |
| *B62K 11/14* | (2006.01) | |

(Continued)

(52) U.S. Cl.
CPC ............. *B62K 23/04* (2013.01); *B62J 45/422* (2020.02); *B62K 11/14* (2013.01); *B62K 23/06* (2013.01); *B62M 25/04* (2013.01); *G05G 1/04* (2013.01)

(58) Field of Classification Search
CPC ........ B62K 11/14; B62K 21/26; B62K 23/02; B62K 23/04; B62K 23/06; B62J 45/40; B62J 45/422; B62M 25/04; G05G 1/00; G05G 1/015; G05G 1/04; G05G 1/06; G05G 1/08; G05G 1/10; G05G 1/12; G05G 9/08
See application file for complete search history.

(56) References Cited

U.S. PATENT DOCUMENTS

| | | | |
|---|---|---|---|
| 4,497,503 A * | 2/1985 | Irwin ..................... | B62K 23/02 180/215 |
| 4,903,936 A * | 2/1990 | Kajiwara ................ | F02D 11/10 251/14 |

(Continued)

*Primary Examiner* — Prasad V Gokhale
(74) *Attorney, Agent, or Firm* — Mark H. Whittenberger; Holland & Knight LLP

(57) ABSTRACT

An electronic throttle control assembly for a vehicle has a housing that mounts to a handlebar of the vehicle and defines an interior. A rack gear is mounted in the interior for movement in a linear, translational, and/or radial direction. A pinion gear within the interior moves the rack gear upon rotation of the pinion gear. A sensor target is coupled to the rack gear. A sensor detects a position of the sensor target and generates an electric signal for a vehicle control unit. A grip is coupled to the pinion gear, rotation of the grip moving the rack gear and sensor target in a linear, translational, and/or radial direction, the electric signal varying based on the change in position of the sensor target. Opposing springs within the housing resist movement of the rack gear and rest in a normally preloaded state.

19 Claims, 8 Drawing Sheets

(51) Int. Cl.
   *B62J 45/422*     (2020.01)
   *G05G 1/04*       (2006.01)

(56)             References Cited

U.S. PATENT DOCUMENTS

| | | | |
|---|---|---|---|
| 6,176,219 B1* | 1/2001 | Culbertson | F02D 11/10 |
| | | | 123/399 |
| 2006/0082362 A1* | 4/2006 | Hino | F02D 11/02 |
| | | | 324/207.2 |
| 2010/0332059 A1* | 12/2010 | Lee | B62K 23/04 |
| | | | 701/22 |
| 2013/0087121 A1* | 4/2013 | Hiei | F02D 9/00 |
| | | | 123/337 |
| 2018/0215456 A1* | 8/2018 | Ozaki | G05G 5/04 |

* cited by examiner

To Vehicle Control Unit

ELECTRONIC THROTTLE CONTROL ASSEMBLY

FIELD OF THE INVENTION

The subject disclosure relates to sensing technology and more particularly to electronic throttle control (or "ETC") assemblies utilizing position sensing.

BACKGROUND OF THE INVENTION

On some powered vehicles, there is an accelerator mechanism used by the operator to control the speed of the motor and, in turn, the vehicle. Typical accelerator mechanisms use a position sensor attached to the operator interface that sends an electrical signal to the vehicle control unit, which then interprets that signal and gives a command to a control device attached to the motor. A system such as this is often referred to as "throttle by wire."

A hallmark of a skilled motorcyclist (or similar recreational vehicle operator) is the ability to precisely deliver the correct amount of throttle at the right time. For example, smooth transitions on and off the throttle play a vital role in keeping the chassis stable in a corner. Furthermore, the interplay between an operator's hand and the throttle control regulates the ability of a rider to optimize vehicle performance and personal safety.

SUMMARY

Many factors must be taken into consideration when packaging an electronic throttle control (or "ETC") into a vehicle's operator controls. Some issues of current ETC packages include but are not limited to the package size, cost, complexity, and longevity. The sensor assemblies of the present technology address the issues of current ETCs as detailed below.

The present technology relates to an electronic throttle control (ETC) assembly useful for applications such as, but not limited to, ETC assemblies for motorcycles and recreational vehicles. In one embodiment, the ETC assembly is composed of a sensor assembly and haptic mechanism assembly attached to the user interface for an ETC to be used for recreational vehicles and the like. More specifically, described herein is an ETC assembly utilizing a sensor target and sensor assembly (e.g. contactless, position sensor assembly and a multi-direction haptic mechanism assembly) to precisely throttle a vehicle.

Several types of vehicles incorporate throttle by wire systems and employ an ETC attached to the operator interface. The subject technology pertains to vehicles where the operator interface requires movement of the hand, fingers, thumb, wrist or other appendage to actuate the position sensor. These vehicles include, but are not limited to, motorcycles, all-terrain vehicles, snowmobiles, and personal watercraft. Two aspects common among these types of vehicles are the presence of operator controls (e.g. buttons, switches, dials) near the accelerator mechanism and the packaging of these operator controls, along with the throttle, onto a handle bar. The handle bar in this case is used to control the direction of the vehicle as well as provide mounting space for the ETC packaging. The operator controls are used to control various vehicle functions and may be positioned on the housing of the ETC packaging.

Many factors must be taken into consideration when packaging an ETC into a vehicle's operator controls. The subject technology of the present application provides many advantages compared to other ETC systems. One such advantage is utilization of a rack and pinion gear in combination with compression springs to create a haptic mechanism. Another advantage includes designing the sensor assembly such that the compression springs fail in a safe state (e.g., where compression springs provide a return force back to center even if spring coils fail). Furthermore, it is advantageous to design an ETC such that free play of the throttle mechanism on the ETC sensor assembly does not impart a change in the output signal.

Packaging of the ETC assembly allows for an integration of auxiliary vehicle controls that are closer to the operator and allows for a higher quantity of controls that are reachable by the operator while their hand is on the throttle control. Additionally, the packaging of the ETC assembly enables the inside of the bar to be clear, which allows for wiring of other accessories (e.g. heated grips, turn signals, lights) within the interior of the bar. Moreover, the sensor assembly of the present technology enables the entire ETC and vehicle controls to be grouped in an overall smaller package for higher aesthetics and lower cost.

Another advantage of the subject technology is that the subject technology enables electrical integration of the ETC electronics with the operator controls, reduces the total number of components, and simplifies electronics overall. Mechanical integration of the ETC components with the operator controls reduces the number of components and allows everything to be packaged in one outer housing. Moreover, integration of mechanical and electrical components simplifies the supply chain for customers (e.g., fewer part numbers to order and service).

Additionally, the ETC assembly design accommodates features that allow the haptics to be adjustable by the operator. The ETC assembly design allows for haptic resistive force in two directions (forward rotation and aft rotation) from the normal state such that two operations are possible for the operator (e.g., applying throttle via aft rotation and cancel cruise control in forward rotation). In addition, the sensor assembly design allows for different haptic resistive force in each rotational direction in order to provide better user feedback. Moreover, resistive force is tailorable to each operator or to project specifications through adjusting spring preload by swapping out the compression spring components with springs of various spring rates, forces, and/or lengths. The ease of resistive force adjustment allows for quick and simple adaptability and customization of products to customer specifications. The ETC assembly design may also allow the compression springs to always be held in a normal preloaded state. The compression springs are only compressed when the grip is rotated (e.g., in either a forward direction or aft direction relative to the user). In operation, the spring not under compression remains preloaded and does not affect the force of haptics when the grip is rotated in the opposite direction.

As another advantage, the ETC assembly rack gear and pinion gear interface is less prone to wear than cam interfaces found on some competitive units. Additionally, the haptic mechanism assembly can be used in different configurations (e.g., thumb throttle or finger throttle). In embodiments, the haptic mechanism assembly and/or the sensor assembly are used for applications (e.g., joysticks, proportional roller, position sensors, and the like).

In one embodiment, the subject technology is directed to an electronic throttle control (ETC) for a vehicle. The ETC includes a housing defining an interior with a first gear or rack gear mounted in the interior for linear, translational, and/or radial movement. The first gear has a first end and a second end. A second gear or pinion gear is mounted in the interior for rotational movement and in operable contact with the first gear such that the first gear moves, e.g. linearly, upon a rotation of the second gear. A sensor target couples to the first gear for movement therewith. A sensor, in proximity to the sensor target, generates an electrical signal based the sensor target and communicates the electric signal to a vehicle control unit. A grip is coupled to the second gear for rotation so that rotation of the grip rotates the second gear and, in turn, moves the first gear and the sensor target so that the electric signal varies based on a change in a position of the sensor target. The electric signal may be transmitted wirelessly. Preferably, aft rotation of the grip results in the first end of the first gear moving toward the housing, and forward rotation of the grip results in the second end of the first gear moving toward the housing so that the housing acts as a hard stop in both directions.

In another embodiment, the subject technology is directed to an electronic throttle assembly having a housing mounted to a vehicle. The housing defines an interior with a first gear mounted therein for movement. In examples, the movement of the first gear is in a linear, translational, or radial direction. The first gear has a first end and a second end. A second gear is also mounted in the interior and in contact with the first gear such that the first gear moves upon a rotation of the second gear. A first compression spring mounts in the interior and extends between the housing and the first end of the first gear. A second compression spring mounts in the interior and extends between the housing and the second end of the first gear, wherein the first and second springs act on the first gear and are retained within the housing such that the springs are normally in a preloaded state against the first gear in an opposing orientation. A grip couples to the housing for rotation, wherein a rotation of the grip in a first direction rotates the second gear and, in turn, the first gear moves so that the first spring compresses further to provide haptic resistance to an operator. The first gear may include a ridge extending into an interior channel of the first gear, the ridge having an inner width less than an outer width of the first and second compression springs to allow the compression springs to act on the first gear until the springs bank against the ridge. The ETC can also include a rod coupled to the first compression spring and second compression spring. A spring stop is fixed to the rod at a location between the first and second springs, wherein the first and second springs are separated by the spring stop and retained within the housing such that the springs are normally in a preloaded state with the first spring banking against the spring stop in a normal position. Compression of the second compression spring from rest, due to a rotation of the grip in a second direction opposite to the first direction, provides tactile feedback to the operator via a resistive force. The difference in compressive force between the compressed state of the first and second spring encourages the return of the first and second spring to the normal position once the operator diminishes torqueing force rotating the grip.

Still another electronic throttle control assembly has a housing defining an interior. A first gear mounts in the interior for movement in a linear, translational, or radial direction, wherein the first gear has a first end and a second end. A second gear is in the interior and in contact with the first gear such that the first gear moves upon a rotation of the second gear. A sensor target couples to the first gear for movement therewith. A sensor generates an electric signal for a vehicle control unit based on a position of the sensor target. A first compression spring mounts in the interior of the housing and extending between the housing and the first end of the first gear. A second compression spring mounts in the interior and extends between the housing and the second end of the first gear. A rod mounts in the interior upon and extends partially into the first compression spring and second compression spring. A grip couples to the second gear, wherein a rotation of the grip in a first direction simultaneously rotates the second gear and, in turn, moves the first gear and the sensor target linearly and/or radially so that the electric signal varies based on change in position of the sensor target. A spring stop couples to the rod, wherein the first and second springs are separated by the spring stop and retained within the housing such that the springs are normally in a preloaded state between the housing and one of the first member or spring stop, wherein movement of the first gear causes the first gear to compress one of the first and second springs, the compressed spring providing haptic resistance to an operator.

The first gear includes a ridge that allows the first and second compression springs to act on the first gear. Preferably, the ridge includes an inner width that is less than an outer width of the first and second compression springs. Aft rotation of the grip can result in the first end of the first gear moving toward the housing, and forward rotation of the grip results in the second end of the first gear moving toward the housing. After compression of the first or second spring by a torqueing force from the operator rotating the grip, a compressive force from the compressed spring encourages the return of the first gear to the normal position once the operator diminishes or removes the torqueing force. Compression of the second compression spring from rest, due to a rotation of the grip in a second direction opposite to the first direction, provides tactile feedback to the operator via a resistive force and when the first gear compresses the first spring, the spring stop prevents the second spring from acting upon the first gear; and when the first gear compresses the second spring, the spring stop prevents the first spring from acting upon the first gear.

It should be appreciated that the subject technology can be implemented and utilized in numerous ways, including without limitation as a process, an apparatus, a system, a device, a method for applications now known and later developed. These and other unique features of the system disclosed herein will become more readily apparent from the following description and the accompanying drawings.

BRIEF DESCRIPTION OF THE DRAWINGS

So that those having ordinary skill in the art to which the disclosed technology appertains will more readily understand how to make and use the same, reference may be had to the following drawings.

DETAILED DESCRIPTION

Figure 1:
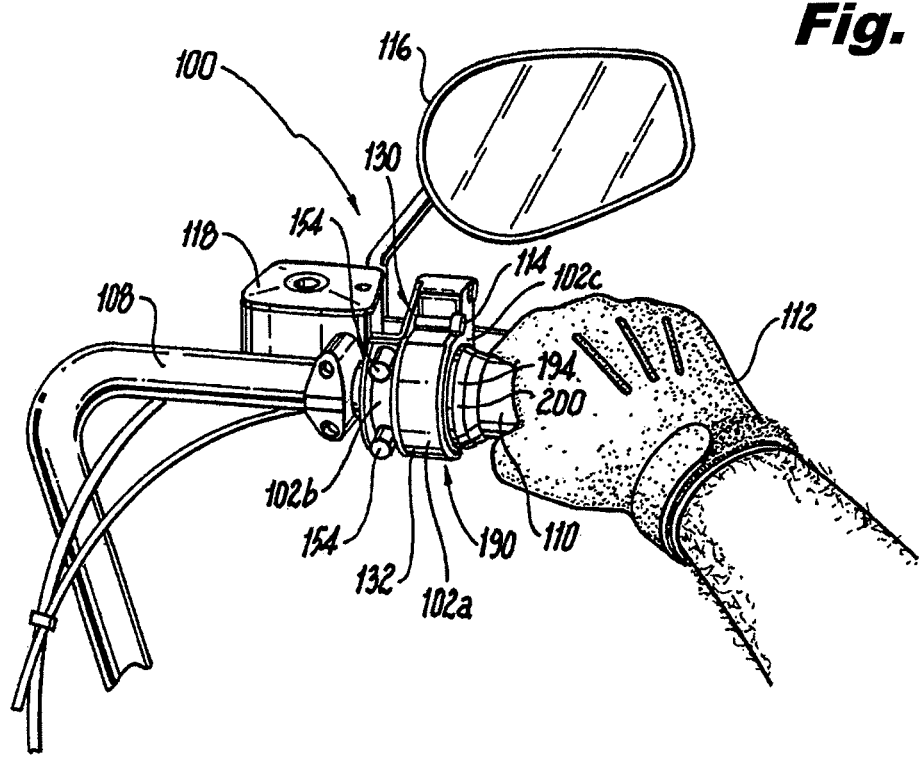
FIG. 1 is a perspective view of an electronic throttle control assembly mounted to a handlebar with an operator's hand on the throttle grip in accordance with the subject technology.

The subject technology overcomes many of the prior art problems associated with electronic throttle control assemblies. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be on top).

Unless specifically stated or obvious from context, as used herein, the term "or" is understood to be inclusive. Unless specifically stated or obvious from context, as used herein, the terms "a", "an", and "the" are understood to be singular or plural.

Other features and advantages of the invention will be apparent from the following description of the preferred embodiments thereof, and from the claims.

Figure 2:
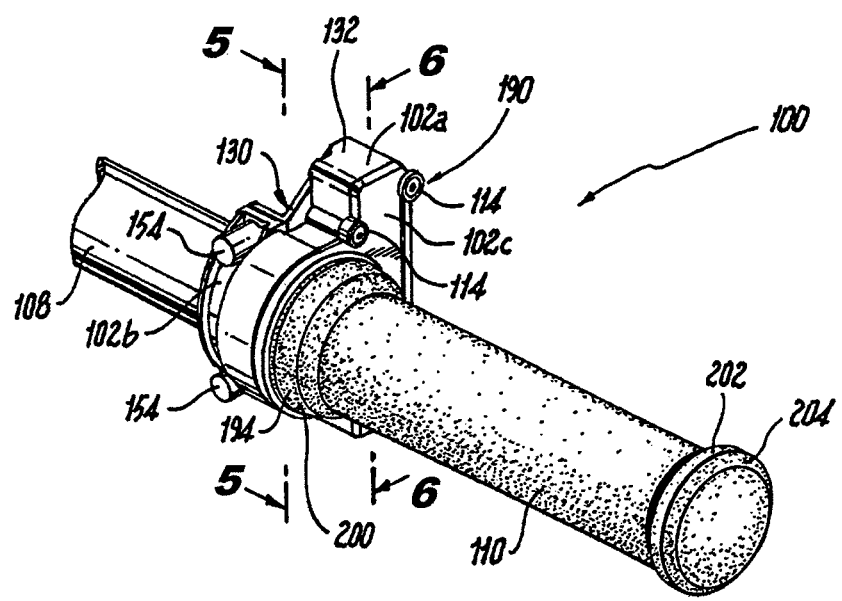
FIG. 2 is a perspective view of an electronic throttle control assembly of FIG. 1 mounted to a handlebar highlighting the grip.

Referring to FIG. 1 and FIG. 2, perspective views show a fully-assembled, ETC assembly 100 that mounts to a handlebar 108 with an operator's hand 112 on a grip 110. The grip 110 contains a first skirt 194 on a distal end 200 and a second skirt 202 on a proximal end 204. Skirts 194, 202 retain the operator's hand on the grip during use of a motor vehicle. Grip 110 further includes a tactile surface which improves retention of an operator's hand, particularly during hot, humid, and/or inclement conditions. A rotation of the grip 110, resulting from the operator's hand 112 delivering a torque, affects components within a housing 102. The ETC assembly 100 is compact and leaves ample space upon the handlebar 108 and the grip 110 for the mounting of a number of additional features (e.g., mirrors 116, the ignition 118, lights, switches, dials, rockers, toggles, push buttons, general operator controls 206 (see FIG. 11), and the like). The ETC assembly 100 is well-suited for recreational vehicles. The handlebar 108 can mount to a motorcycle, recreation vehicle, or other like device. In other embodiments, the ETC assembly 100 is applied to items, such as but not limited to dual axis and single axis joysticks, proportional rockers and switches, and proportional dials. Furthermore, the subject technology is broadly applicable to any type of sensor.

The housing 102 mounts to the handlebar 108 and houses various sensing components within an interior 122, as discussed in more detail below. In different embodiments, the housing 102 takes on a variety of shapes including but not limited to polygonal shapes, organic shapes, circular shapes, and/or combinations thereof. The grip 110 couples to the housing 102 such that the housing 102 is between the handlebar 108 and the grip 110. In some instances, the handlebar 108 extends through the ETC housing 102 to the end of the grip 110. In alternative embodiments, the housing 102 mounts onto other structures (e.g. only the handlebar 108, only the grip 110, a cast aluminum structure attached to the front forks, or other non-handlebar structures).

Figure 3:
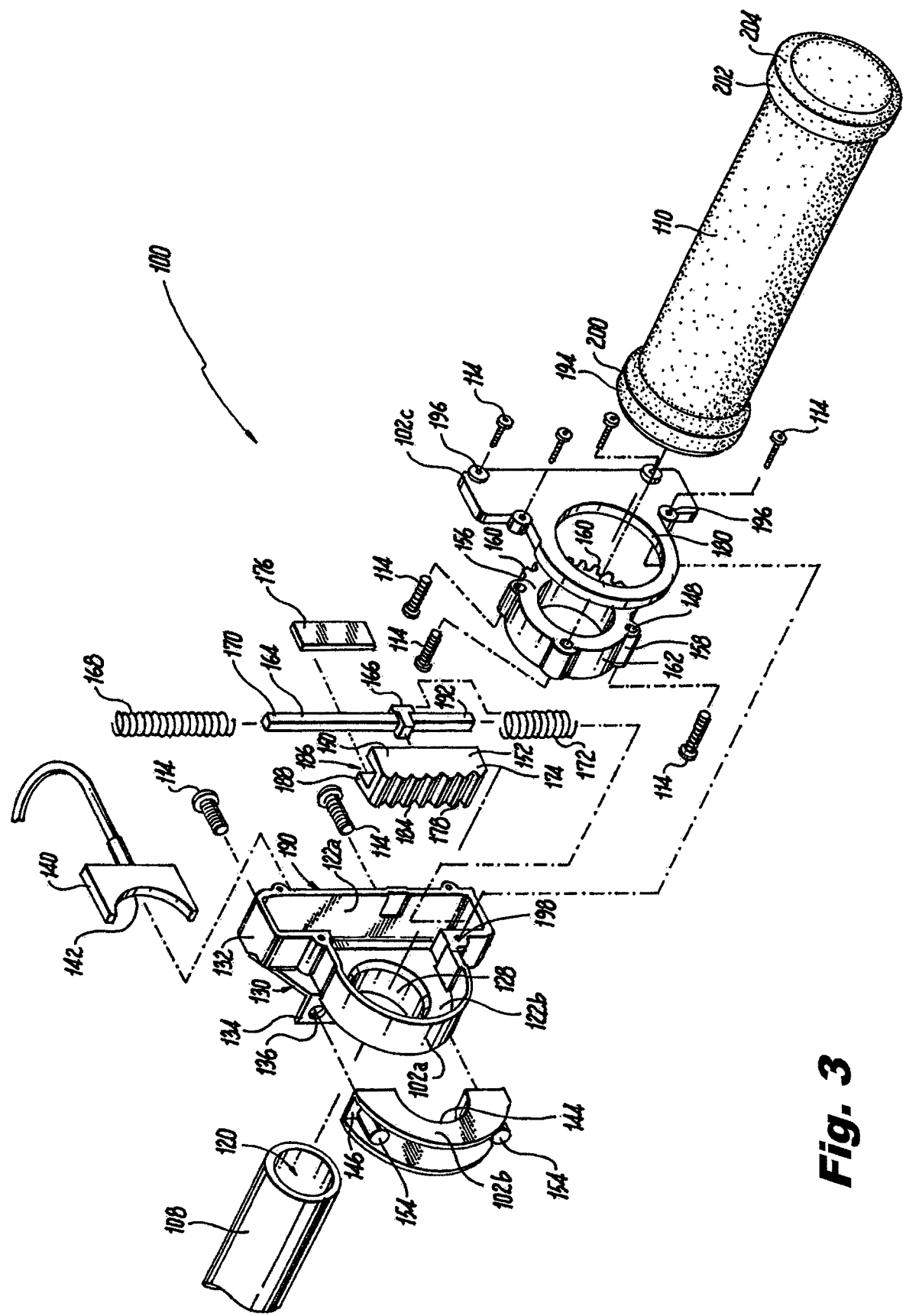
FIG. 3 is an exploded perspective view of the components of an electronic throttle control assembly of FIG. 1.

Referring now to FIG. 3, an exploded perspective view shows the components of the ETC assembly 100. The housing 102 comprises a body 102a, a mounting bracket 102b, and a cover 102c (collectively referred to as housing 102). The body 102a, bracket 102b and cover 102c can be held together by fasteners 114 (e.g., screws, pins, etc.), welding, epoxies/glues, and/or the like. The housing 102 shelters components within the interior 122 from the external environment. The housing 102 comprises two or more pieces and provides easy access to the interior 122 for quick assembly. Alternate mounting methods exist that do not include mounting bracket 102b.

In FIG. 3, the interior 122 of the housing 102 has two compartments, a rectangular gear compartment 122a and a circular gear compartment 122b (collectively the interior 122). Gear compartment 122b contains a semicircular ledge 126. The ledge 126 defines a circular channel 128 that is sized to accommodate the handlebar 108.

The housing body 102a contains a back panel 130 that fully covers gear compartment 122a on a distal end 132 of the body 102a. The back panel 130 contains at least two flanges 134 that contain one or more holes 136 for mounting fixtures 114. Alternatively, other methods of mounting are utilized for back panel 130 assembly. Additionally, the housing body 102a contains an enclosure 138 (FIG. 4) for a sensor 140. The shape of sensor 140 depends on allowable space within the ETC assembly 100. In embodiments, the sensor 140 has a crescent edge 142 sized to accommodate the handlebar 108. The flanges 134 are a part of and/or connect to the enclosure 138. The sensor 140 may be electrically wired or wirelessly connected to enable transmission of electrical signals to a vehicle control unit (not shown) and/or other electrical devices.

Mounting bracket 102b is semicircular and contains an interior semicircular arch 144 sized to fit around a portion of the handlebar 108. Mounting bracket 102b has at least two rectangular ends 146 that each contain an elongated cylindrical protrusion 154 designed to house a fixture or mounting screw 114. The rectangular ends 146 align with the flanges 134, such that mounting screws 114 thread through holes 136 and fix inside of cylindrical protrusions 154, thus mounting the housing 102 onto handlebar 108. The cylindrical protrusions 154 are designed to both secure mounting screws 114 in a stable position and to protect mounting screws 114 from the external environment. Alternatively, mounting bracket 102b mounts the ETC assembly to a vehicle structure other than a handlebar 108.

Still referring to FIG. 3, the housing cover 102c is designed to enclose the proximal end 190 of housing body 102a. Housing cover 102c contains a circular channel 180. The circular channel 180 is configured to accommodate the interaction between pinion gear 156 and grip 110. Circular channel 180 is also sized such that a first skirt 194 of grip 110 abuts the cover 102c. The cover 102c contains bores 196 designed to accommodate screws 114 that couple cover 102c to the proximal end 190 of housing body 102a via complementary threaded passages 198 on the proximal end 190 of housing body 120a. Alternate methods of securing cover 102c are employed in alternative embodiments. In the configuration described by FIG. 3, the second gear 156 is a pinion gear 156 and the first gear 174 is a rack gear 174 in embodiments. For the purposes of this application, rack gear 174 and pinion gear 156 will be used to better describe but not limit the scope of the technology. Thus, after the pinion gear 156, rack gear 174 with sensor target 176, rod 164 with spring stop 166, and springs 168, 172 are disposed within the interior 122, the cover 102c may couple to the body 102a and provide protection of the components within the interior from the external environment. In some embodiments, the grip 110 fixes to the housing 102 through the coupling of housing body 102a and housing cover 102c, where mounting screws 114 pass through bores 196 and complementary passages 198 to fixedly mount the body 102a and the cover 102c.

A pinion gear 156 rotatably mounts in the interior 122. The pinion gear 156 contains a plurality of circumferentially spaced teeth 160. The teeth 160 may be spaced at variant intervals (e.g. spaced close together, spaced far apart, spaced evenly, spaced haphazardly, spaced in patterns, and the like) along the exterior surface 162 of pinion gear 156 as needed to interface with other gears. The teeth 160 can also be various shapes (e.g. circular, polygonal, rectangular). Preferably, the teeth 160 are separated by at least nine evenly spaced grooves.

The pinion gear 156 forms at least three nobs 158 for coupling to the grip 110. More particularly, the nobs 158 contain threaded bores 148 that accommodate screws 114 so that the grip 110 directly mounts to the pinion gear 156. As would be appreciated, the nobs 158 lock the pinion gear 156 to the grip 110 such that a rotation of the grip 110 results in a rotation of the pinion gear 156. The pinion gear 156 and grip 110 coupling interface is not required. Several other options for grip interface coupling are implemented in alternative embodiments.

Still referring to FIG. 3, opposing first and second compression springs 168, 172 are secured by the elongated rod 164. The rod 164 acts as a guide for the springs 168, 172 so that both springs 168, 172 can remain in a preloaded state when desired. The rod 164 includes a spring stop 166 which can be selectively positioned between the first and second compression springs 168, 172. The first compression spring 168 is retained upon a first end 170 of the rod 164 and the second compression spring 172 is retained upon a second end 192 of rod 164. The springs 168, 172 may be the same length or different lengths. Preferably, the first spring 168 is longer than the second spring 172. The first and second compression springs 168, 172 can share a common spring constant or, alternatively, each spring 168, 172 can have a different spring constant. The rod 164 can be any structure from a stamped piece from a sheet of metal to an injection molded piece of plastic and the like.

A rack gear 174 within the housing 102 interior 122 interacts with the pinion gear 156. The rack gear 174 has a sensor target 176 coupled thereto. In some embodiments, the sensor target is a magnet. The rack gear 174 is disposed around the rod 164 and compression springs 168, 172. In embodiments, the sensor target 176 is coupled to a backside 188 of the rack gear 174. In alternative embodiments, sensor target 176 couples to any area of rack gear 174. The rack gear 174 contains complimentary teeth 178 on a front side 184, which allow for interaction with the teeth 160 of the pinion gear 156. The rack gear 174 contains an interior channel 186 sized to fit around rod 164, spring stop 166, and compression springs 168, 172.

Figure 4:
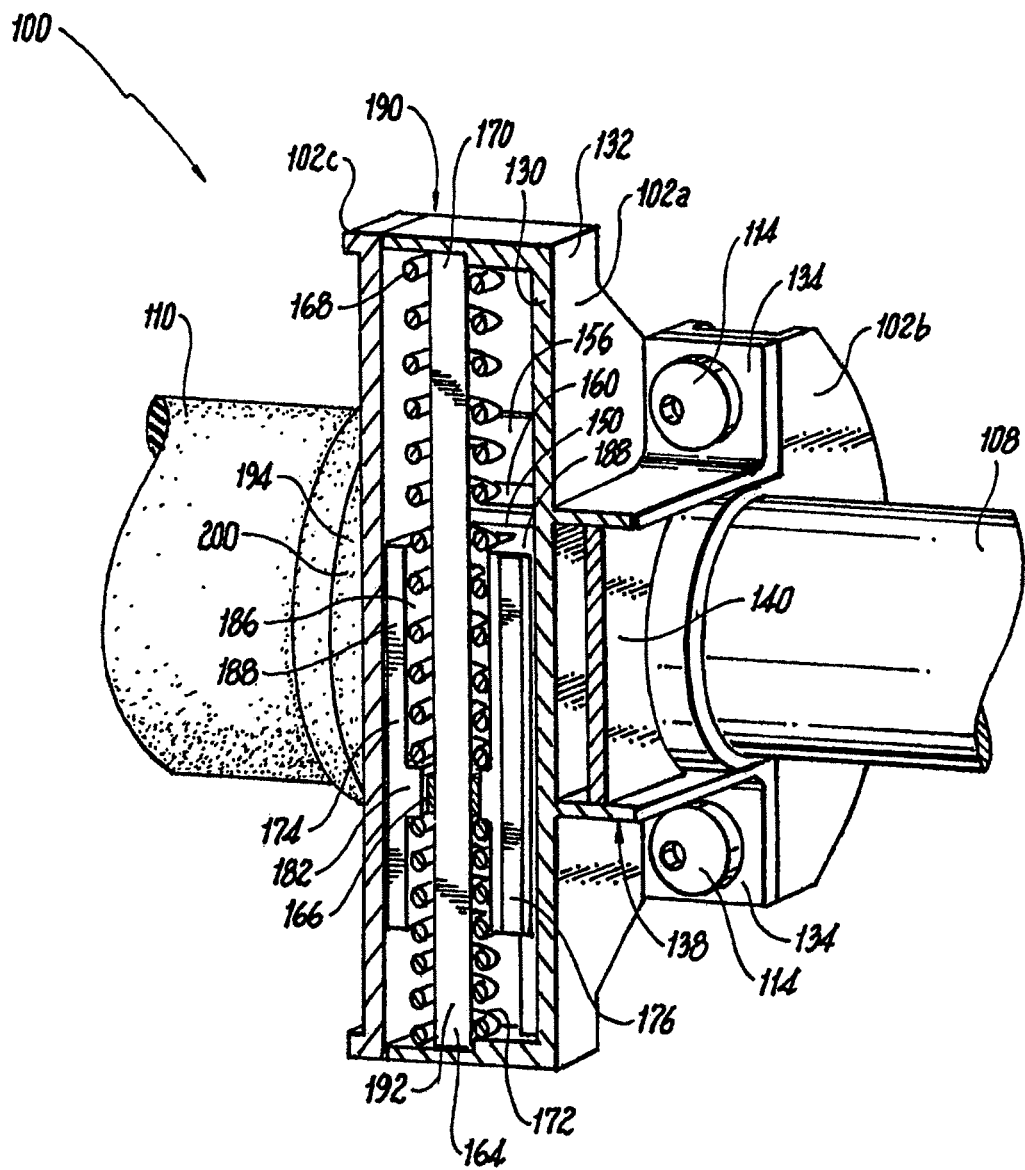
FIG. 4 is an enlarged local view of the rear of the housing of the electronic throttle control assembly of FIG. 3, showing inner details.

As best seen in FIG. 4, the ridge 182 of rack gear 174 extends into the channel 186 such that the ridge 182 is wide enough to allow passage of rod 164 and spring stop 166, but narrow enough to prevent the passage of the compressions springs 168, 172. This can be accomplished by having the ridge 182 form a rectangular shaped passage. In such a case, the narrow width of the rectangular passage prevents the springs 168, 172 from passing through. Meanwhile, the spring stop 166 can also be a rectangular shape. The spring stop 166 is narrower than the passage through the ridge 182 to allow the spring stop 166 to move through the ridge 182, yet has a longer width than the springs 168, 172 in the long direction, preventing the springs 168, 172 from passing therethrough. The rack gear 174, rod 164, and springs 168, 172 are disposed within the interior 122 such that the first and second compression springs 168, 172 are compressed in a normal preloaded state between the housing 102 and spring stop 166 and/or ridge 182. The rack gear 174 interacts with the compression springs 168, 172 through the ridge 182 such that movement of the rack gear 174 from a normal position results in the compression of either the first compression spring 168 or the second compression spring 172 past the normal preloaded state.

Referring to FIGS. 3 and 4, the rack gear 174 and pinion gear 156 are positioned such that the teeth 178 of the rack gear 174 and the teeth 160 of the pinion gear 156 engage in a complimentary manner. The rack gear 174 and pinion gear 156 interact such that a rotation of the pinion gear 156 results in a linear and/or radial motion of rack gear 174. A sensor 140 (e.g. a Hall effect sensor, contactless sensor) is placed in close proximity to the rack gear 174 and the sensor target 176, "close proximity" meaning that the sensor 140 can detect a position of the sensor target 176. The sensor 140 detects a strength of the signal from the sensor target and generates a corresponding electric signal based on the position of the sensor target. When a torque causes a rotation of the grip 110, the pinion gear 156, and thus the rack gear 174, with the sensor target 176, are caused to move. The strength of the signal from the sensor target will change as the position of the sensor target 176 changes. This causes a corresponding change in the strength of the electrical signal generated by the sensor 140. The electrical signal, and change in electrical signal, can then be used in a vehicle control unit, for example, to accelerate the vehicle when the grip 110 is rotated. In some cases, an electronic circuit (not shown) is included within the sensor 140 which interprets the signal from the sensor 140 and sends a processed output signal, such as a throttle control instruction, to the vehicle control unit (not shown). Alternatively, processing can be done entirely within the vehicle control unit.

As best seen in FIGS. 4, 6, 8, and 10, the rack gear 174 includes the ridge 182 which extends into channel 186. The ridge 182 is sized to form a central channel that is wider than the width of the spring stop 166, allowing the spring stop 166 to pass therethrough. However, the ridge 182 has a narrower outer width than that of the compression springs 168, 172, preventing the compression springs 168, 172 from passing through the ridge 182 as the rack gear 174 moves. This allows movement of the rack gear 174, e.g. linear, translational, and/or radial movement, to compress one of the springs 168, 172 depending upon the direction of rotation. In other embodiments, multiple ridges 182 extend from an upper end 150 of the rack gear 174 and a lower end 152 of the rack gear 174. In some embodiments with ridges 182 on the upper end 150 and the lower end 152, the ridge 182 on the upper end 150 selectively interacts with compression spring 168, and the ridge 182 on the lower end 152 selectively interacts with compression spring 172.

Therefore, referring now to FIGS. 1-10 generally, when an operator exerts a torque upon the grip 110 such that grip 110 undergoes a rotation from center, the pinion gear 156 simultaneously rotates and causes a movement of rack gear 174, e.g. linear, translational, and/or radial movement (i.e. along the rod 164). The movement of rack gear 174, in turn, compresses either the first compression spring 168 or second compression spring 172 (depending on the direction of rotation) past a normal pre-loaded state against the housing 102. The compression of either spring 168, 172 results in a resistive force that provides tactile feedback through the grip 110 to the operator 112.

Figure 5:
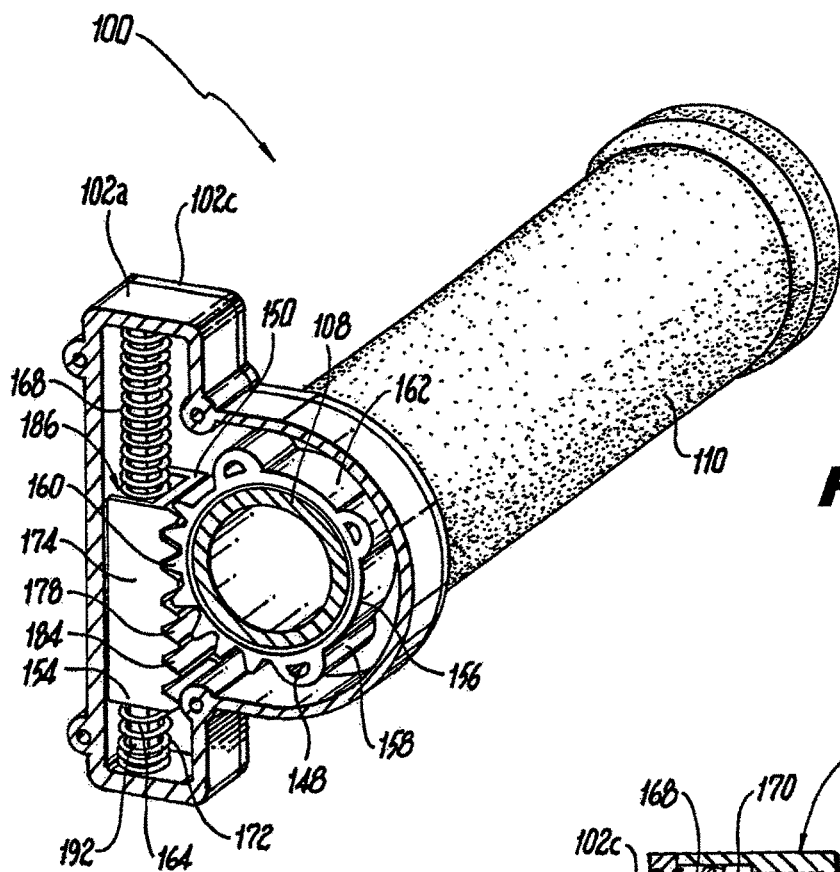
FIG. 5 is a sectional perspective view, taken at cutline 5-5 of FIG. 2, showing the components of the electronic throttle control assembly of FIG. 1 with the grip at rest.
Figure 6:
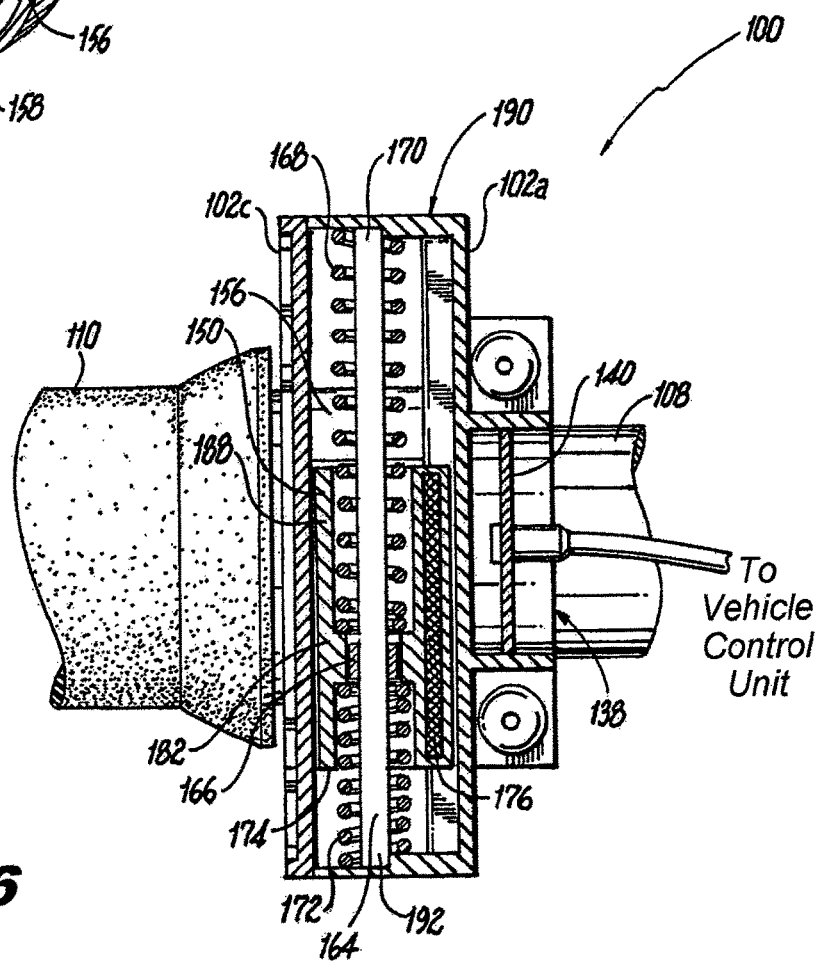
FIG. 6 is a sectional elevational view of an electronic throttle control assembly of FIG. 1, taken at cutline 6-6 of FIG. 2, showing the position of rack at rest.

Referring now to FIGS. 4-6, cross-sectional views of the ETC assembly 100 are shown with the grip 110 at a rest. When the grip 110 is at rest, the rack gear 174 and compression springs 168, 172 are in a normal position or idle position. In the normal position, the compression springs 168, 172 are in a preloaded state impinged between the housing 102 and the spring stop 166 and/or rack gear 174. Preferably, one of the springs 168, 172 overpowers the other so that the stronger spring has pushed the ridge 182 and, in turn, the rack gear 174 to a position where the rack gear 174 will remain at rest. The other spring 168, 172 (i.e. the weaker spring 168, 172) can provide an opposing force against an opposite side of the ridge 182 (or a separate ridge 182 if there are multiple ridges) or can rest against the spring stop 166. As shown, the lower spring 172 has come to rest against the spring stop 166 in FIGS. 4-6 so that ridge 182 of the rack gear 174 will return to a location just above the spring stop 166 in the normal position. In some instances, a lower edge of the spring stop 166 aligns with a lower edge of the ridge 182 to better retain springs 168, 172 in a normal pre-loaded state. In other instances, the lower edge of the spring stop 166 does not align with a lower edge of ridge 182. The ETC assembly 100 can be calibrated so that the normal position does not generate a throttle signal.

Still referring to FIGS. 4-6, the teeth 178 on rack gear 174 and teeth 160 of pinion gear 156 interlace such that rack gear 174 can be moved out of the normal position by rotation of the grip 110. Likewise, the sensor target 176, being coupled to the rack gear 174, moves when the grip 110 is rotated. In particular, the rack gear 174 and sensor target 176 move in a linear, translational, and/or radial direction in response to rotation of the grip 110, toward either an upper end 150 (See FIGS. 9 and 10) or a lower end 152 (See FIGS. 7 and 8). In some embodiments, the sensor target 176 is on the backside 188 of rack gear 174 and adjacent to sensor 140 surrounded by enclosure 138 (See e.g., FIG. 4 and FIG. 6).

Figure 7:
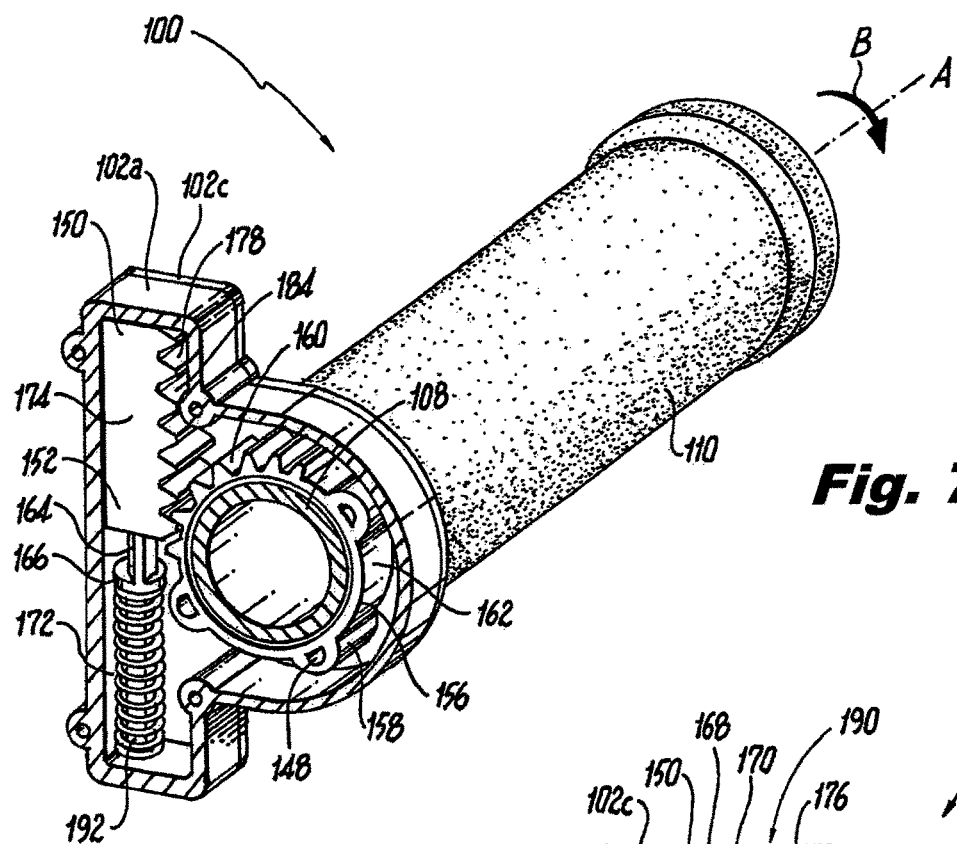
FIG. 7 is a sectional perspective view, taken at cutline 5-5 of FIG. 2, showing the components of the electronic throttle control assembly with the grip rotated 90 degrees.
Figure 8:
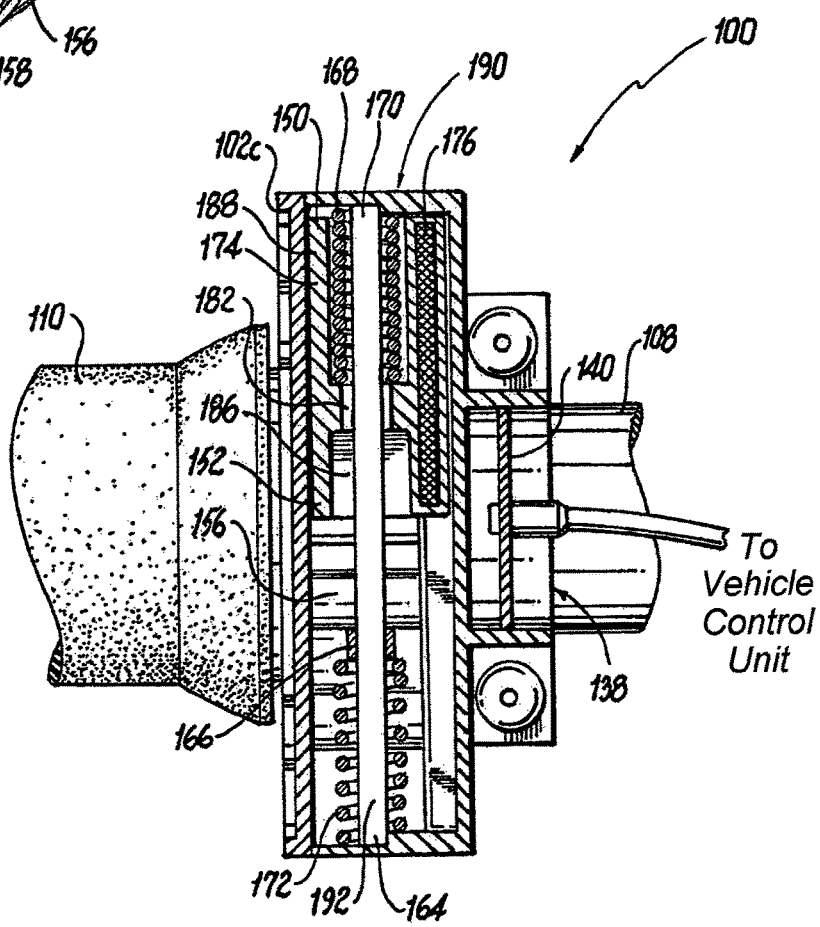
FIG. 8 is a sectional elevational view of the electronic throttle control assembly, taken at cutline 6-6 of FIG. 2, showing the rack at the top extent of travel.

In further detail, FIGS. 7 and 8 show the ETC assembly 100 with the grip 110 fully rotated in an aft direction from the normal resting position. Aft rotation is denoted by rotational arrow B that turns around pivot axis A. Range of motion in aft direction is from approximately 40° to approximately 110° or more depending on device specifications. When the grip 110 is torqued to maximize aft rotation, the rack gear 174 and sensor target 176 move to the top most extent of travel, where upper end 150 abuts housing body 102a. In embodiments, ninety degrees of aft rotation from the normal position maximizes aft rotation. Upon aft rotation, the first compression spring 168 is in a compressed state between the housing body 102a and the ridge 182, and the second compression spring 172 is in a relaxed, semi-preloaded state between the housing body 102a and spring stop 166. When an operator 112 rotates grip 110 in the aft direction, simultaneous rotation of the pinion gear 156 in the aft direction moves the upper end 150 of the rack gear 174, with sensor target 176 coupled thereto, upward in the housing 102. The movement of sensor target 176 is detected by position sensor 140. That is, the sensor 140 generates an electric signal that varies as the position of the sensor target 176 changes. This electrical signal is preferably sent to a device (e.g. vehicle control unit, electronic circuit board, and the like) for processing to create a control signal or an output for the result desired by the operator (e.g., provides fuel or power to an engine, activates cruise control, provides a brake force and the like).

Additionally, compression of first compression spring 168 from rest, due to aft rotation of grip 110, provides tactile feedback to the operator 112, via a resistive force, that a particular desired function has been performed and/or activated. When the first spring 168 is in a compressed state, second spring 172 is stopped by the spring stop 166 and therefore does not act on the rack gear 174. The force from the compressed spring 168 urges the rack gear 174 back towards the normal position, such that once the operator 112 removes their torqueing force from the grip 110, the rack gear 174 will move back into the normal position.

Figure 9:
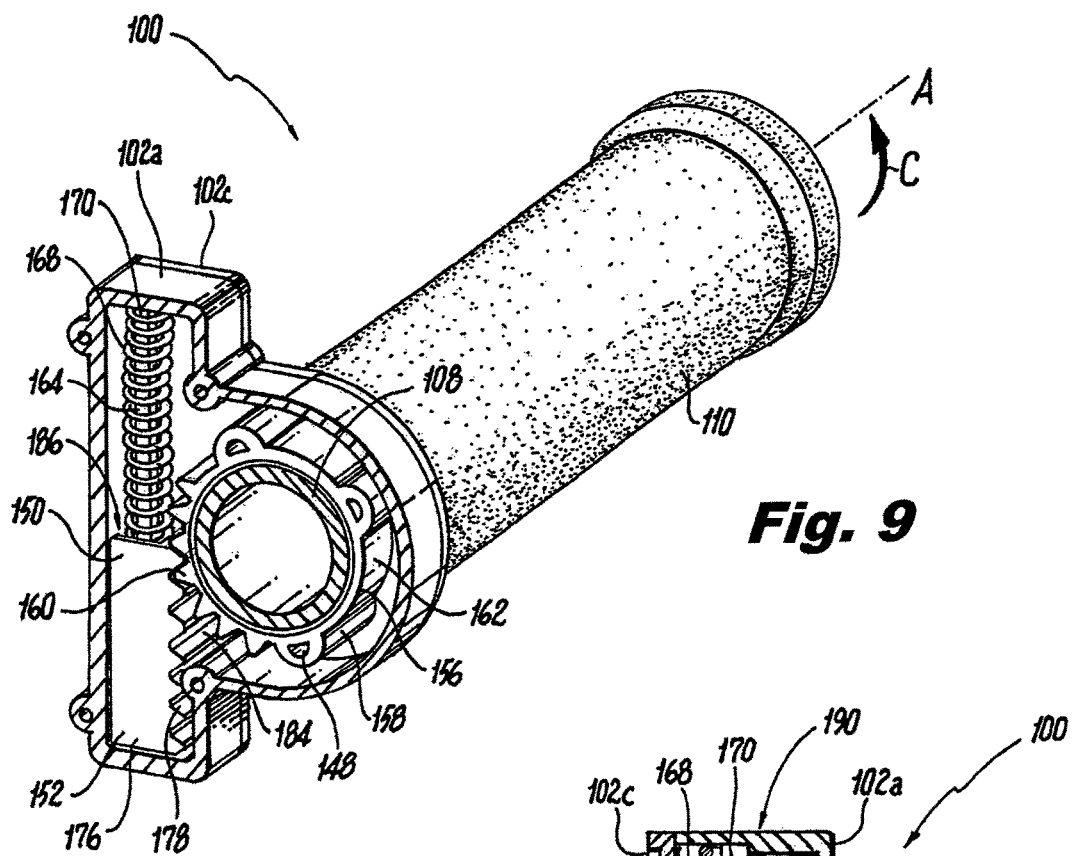
FIG. 9 is a sectional perspective view, taken at cutline 5-5 of FIG. 2, showing the components of the electronic throttle control assembly with the grip rotated 20 degrees.
Figure 10:
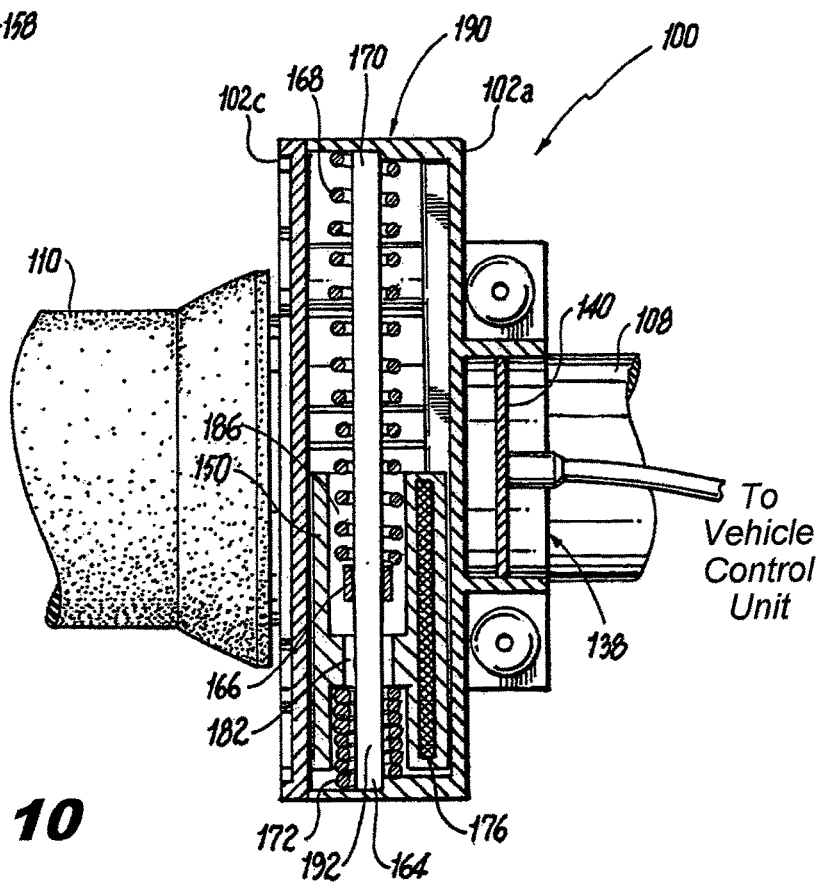
FIG. 10 is a sectional elevational view of the electronic throttle control assembly, taken at cutline 6-6 of FIG. 2, showing the rack at the lowest extent of travel.

Turning to FIGS. 9 and 10 show the ETC assembly 100 with grip 110 fully rotated in a forward direction from a normal resting position. Forward rotation is denoted by rotational arrow C that turns around pivot axis A (FIG. 9). Rotation of the grip 110 in the forward direction simultaneously rotates pinion gear 156 in the forward direction and moves lower end 152 of rack gear 174, with sensor target 176 coupled thereto, toward housing body 102a. As discussed with respect to aft rotation above, the sensor 140 generates an electric signal based on the position of the sensor target 176, the electric signal changing as the sensor target 176 moves. Further, and as discussed above, the electrical signal can be processed and/or used for various applications within the vehicle. When the grip 110 is torqued to maximize forward rotation, the rack gear 174 and sensor target 176 move to the lowest extent of travel, where the lower end 152 the abuts housing body 102a. In effect, the housing body 102a acts as a mechanical stop. In alterative embodiments, other structures act as a mechanical stop. As the grip is rotated forward, the operator 112 is provided with tactile feedback, via a resistive force from the second compression spring 172, alerting the operator 112 that a particular desired function has been performed and/or activated. Upon forward rotation, the second compression spring 172 is in a further compressed state between the housing body 102a and the ridge 182 while the first compression spring 168 is prevented from acting on the rack gear 174 by the spring stop 166. When the operator 112 releases their rotational force on the grip 110, force from the compressed second spring 172 will return the rack gear 174 to the normal position.

In an alternative embodiment, the length of the rack gear 174 and, thereby, the number of teeth 178 thereon may determine the amount of travel that the pinion gear 156 moves the rack gear 174. Alternatively, the number of teeth 178 on the pinion gear 156 may determine the maximum drive range of the rack gear 174. Range of motion in the forward direction is from approximately 0° to approximately 40° or more depending on device specifications. In some embodiments, twenty degrees of forward rotation from normal position maximizes forward rotation.

Figure 11:
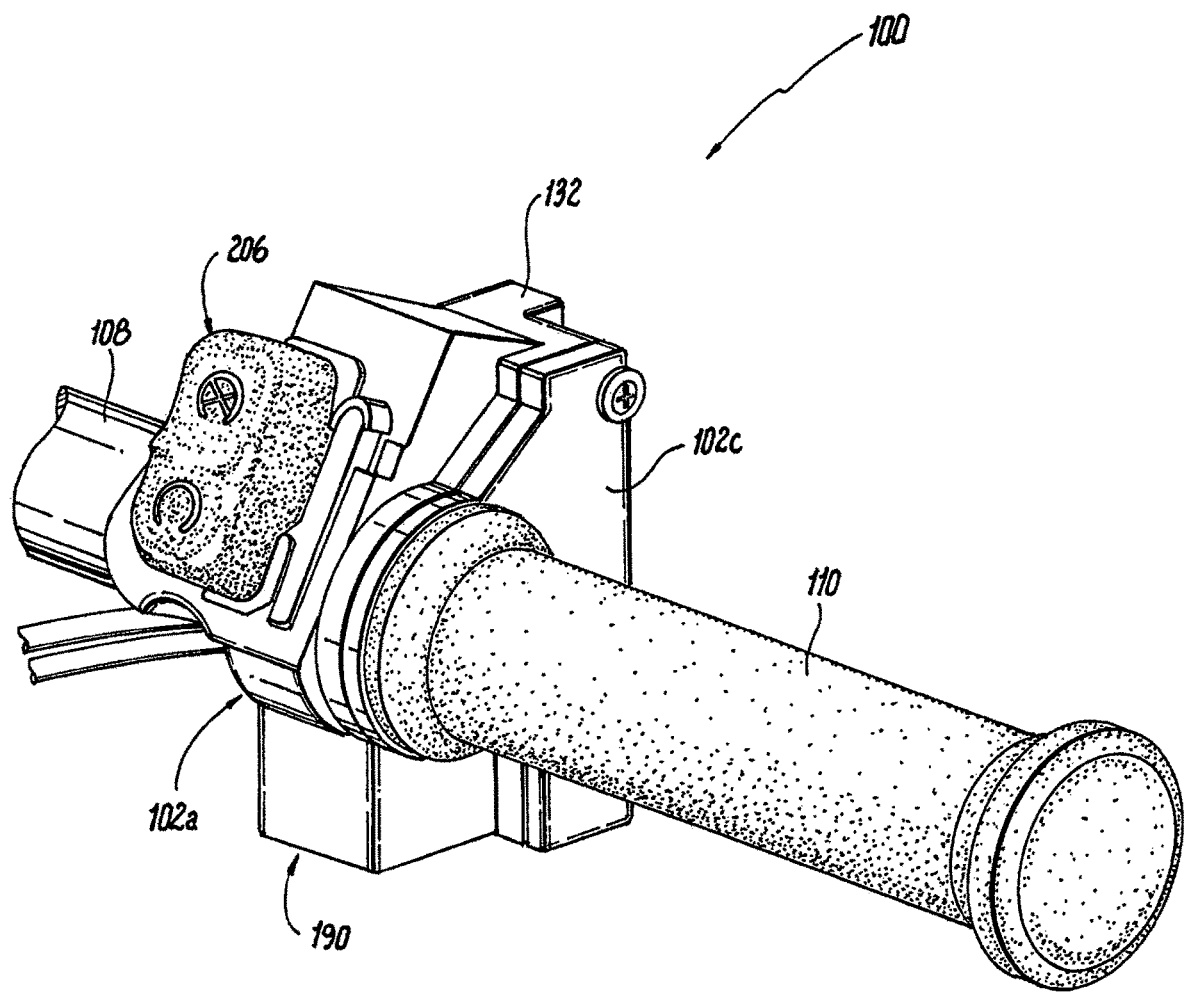
FIG. 11 is a perspective view of an electronic throttle control assembly including controls mounted thereon in accordance with the subject technology.

Looking to FIG. 11, the ETC assembly 100 is shown with included controls 206 (e.g., switches, dials, buttons, and the like). The controls 206 are mounted directly on the housing body 102a, in proximity to the grip 110, making the controls 206 easily accessible by the operator 112. The mechanical layout of the ETC assembly 100 is such that most of the components are on one side of the pivot axis A in FIG. 7 and FIG. 9. This leaves ample free space on the other side of the pivot axis A to be used for placement of additional vehicle controls 206 that are located closer to the operator 112. Further, this leaves room for a higher volume/larger quantity of controls 206 compared to other ETC assembly designs. Wiring for the controls 206 can run through the interior 122 of the housing 102 to further encase and protect the wiring therein.

In some embodiments, the empty handlebar channel 120 protects the wiring of additional electronic devices (not shown) that are wired to controls 206. In alternative embodiments, the grip 110 contains a cavity (not shown) that provides additional space for and protection of additional electronic devices linked to controls 206.

Referring now to FIGS. 1-11 generally, the subject technology relates to the ETC sensor assembly 100. Within the ETC assembly 100, the sensor 140 generates an output signal based on the position of the sensor target 176 and provides the output signal to a vehicle system which interprets the signal and performs an action. The ETC sensor assembly 100 also provides a resistive force back to the operator 112 to aid in indicating that the intended action is being performed and to help return the mechanism back to center (normal position).

In one example, the ETC assembly 100 can be used to accelerate a vehicle, such as a motorcycle. The operator 112 rotates the grip 110 in the aft direction when the operator 112 wants to accelerate. In response to a rotation of the grip 110, the pinion gear 156 rotates and moves the rack gear 174 and sensor target 176. The stationary sensor 140 detects the new position of the sensor target 176. The strength of the output signal from the sensor 140 varies with the movement of the sensor target 176, for example, with a greater or lesser signal being generated the further the sensor target 176 is from the sensor 140. Additionally, the signal output from the sensor 140 results in a corresponding amount of fuel and/or power being delivered to the engine such that a greater signal output results in a greater amount of fuel and/or power delivery to the engine. Upon rotation in the aft direction to signal acceleration, rack gear 174 compresses spring 168 into housing 102a while spring stop 166 retains spring 172 with some amount of preload. Compression of the spring 168 provides a resistive force to the operator 112 and allows for determination of whether to increase acceleration via further rotation of the grip 110 in the aft direction or decrease acceleration via restoring rotation of the grip 110 to a normal position.

In some applications, the design of the ETC assembly 100 accommodates rotation in a single direction (e.g. the grip 110 rotates in either the forward or aft direction). In other instances the grip 110 rotates in each direction (forward and aft direction). In some cases, both forward and aft rotation can be relied upon either for the same effect (e.g. both for forward acceleration) or for differing effects (e.g. forward acceleration and braking). When different effects are desired for forward and aft rotation, the sensor 140 can be designed accordingly. For example, the sensor 140 can include multiple individual sensing elements which each monitor the strength of the sensor signal of the sensor target 176 and generate an electrical signal. In such a case, the signals from the multiple elements can be relied upon to determine both if the sensor target 176 has moved as a result of forward or aft rotation of the grip 110, as well as the amount of rotation of the grip 110, based on the signals generated by the sense elements. In embodiments, the strength of the sensor signal is due to magnetic, capacitive, inductive, or other noncontact sensing outputs. In one embodiment, an additional sensor is included to determine whether rotation has occurred in the forward or aft direction.

In some instances, the ETC assembly 100 is applicable to a boat throttle. The boat throttle may have a lever attached perpendicularly to the grip 110 or may be directly, rotatably mounted to the pinion gear 156. A forward movement of the lever by an operator 112 results in a forward rotation of the grip 110 and the pinion gear 156. Forward movement of the pinion gear 156 provides a movement (e.g. linear, translational, and/or radial movement) of the rack gear 174 and corresponding sensor target 176 and, in turn, compresses second compression spring 172 between housing body 102a and the ridge 182. Sensor 140 detects the change in position of the sensor target 176 and sends a signal to a vehicle control unit that boosts gas or power to the engine and, in turn, glides the boat in a reverse direction such that the stern of the boat is directing the forward movement of the vessel.

In some applications of a boat throttle, an aft movement of the lever by an operator 112 results in aft rotation of the grip 110 and the pinion gear 156. Aft movement of the pinion gear 156 provides a movement of the rack gear 174 and corresponding sensor target 176 and, in turn, compresses spring 168 between housing body 102a and the ridge 182. Sensor 140 detects the change in position of the sensor target 176 and sends a signal to a vehicle control unit that boosts gas and/or power to the engine which directs the forward movement of the vessel. Thus, forward rotation of the ETC assembly 100 selectively controls the bow-directed forward movement of the vessel while aft rotation selectively controls the stern-directed forward movement of the vessel.

Similar to applications of ETC assembly 100 to a boat, the ETC assembly can also provide acceleration forward via aft rotation of the grip 110 and acceleration backward via forward rotation of the grip 110 for machines such as personal transport vehicles such as made by Segway of Bedford, N.H., go-carts, wheelchairs, remote controlled vehicles (e.g. drones, cars, helicopters, toys), and the like. Further, and as mentioned above, the ETC assembly 100 need not be incorporated in a vehicle, and can instead be incorporated in other systems such as, but not limited to, dual axis and single axis joysticks, proportional rockers and switches, and proportional dials. Each of these items can utilize the design of the subject technology to leverage similar advantages as previously described above. Therefore rotation of the grip 110 need not trigger acceleration of a vehicle, but can provide any electrical and/or mechanical response desired by the user for a particular application.

Figure 12:
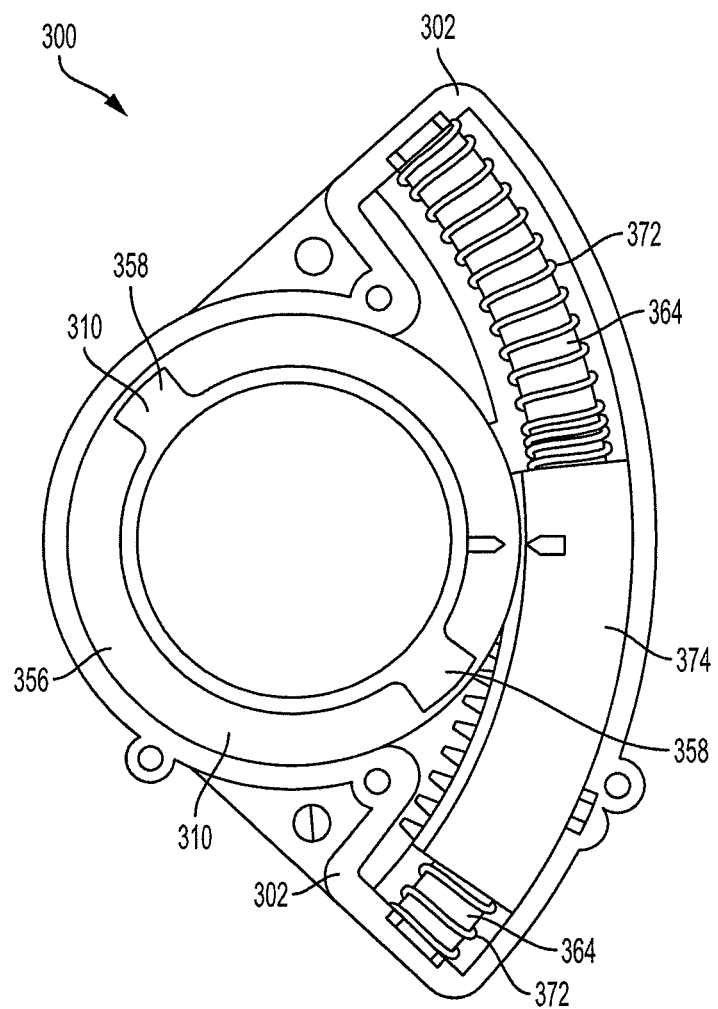
FIG. 12 is a sectional perspective view showing the components of another electronic throttle control assembly with the grip rotated and configured so that the rack gear moves along an arc in accordance with the subject technology.

Referring now to FIG. 12, a sectional perspective view showing the components of another electronic throttle control assembly 300 with the grip rotated and configured so that the rack gear moves along an arc in accordance with the subject technology. Similar elements to those described in connection with above-described embodiments are indicated with the like reference numbers. Many elements are similar as those of the foregoing embodiments and, thus, are not further described herein. The primary difference between the embodiments is that the first gear or rack gear 374 travels in an arcuate direction. As a result, the overall profile of the housing 302 can be reduced. As can be seen, the first gear 374, the rod 364 and the housing 302 are arcuate shaped to accomplish the arcuate movement.

While the subject technology has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. An electronic throttle control assembly of a vehicle comprising:
   a) a housing defining an interior;
   b) a first gear mounted in the interior for movement, wherein the first gear has a first end and a second end;
   c) a second gear mounted in the interior for rotational movement and in operable contact with the first gear such that the first gear moves upon a rotation of the second gear;
   d) a sensor target coupled to the first gear for movement therewith;
   e) a sensor in proximity to the sensor target, generates an electrical signal based the sensor target and communicates the electric signal to a vehicle control unit; and
   f) a grip couples to the second gear so that rotation of the grip rotates the second gear and, in turn, moves the first gear and the sensor target so that the electric signal varies based on a change in a position of the sensor target, wherein aft rotation of the grip results in the first end of the first gear moving toward the housing so that the housing acts as a hard stop of aft rotation.

2. The electronic throttle control assembly of claim 1, wherein the electric signal is transmitted wirelessly.

3. The electronic throttle control assembly of claim 1, wherein forward rotation of the grip results in the second end of the first gear moving toward the housing so that the housing acts as a hard stop in both directions.

4. An electronic throttle assembly for a vehicle comprising:
   a) a housing mounted to the vehicle, the housing defining an interior;
   b) a first gear movably mounted in the interior wherein the first gear has a first end and a second end;
   c) a second gear in the interior and in contact with the first gear such that the first gear moves upon a rotation of the second gear;
   d) a first compression spring mounted in the interior and extending between the housing and the first end of the first gear;
   e) a second compression spring mounted in the interior and extending between the housing and the second end of the first gear, wherein the first and second compression springs act on the first gear and are retained within the housing such that the first and second compression springs are normally in a preloaded state against the first gear in an opposing orientation; and
   f) a grip coupled to the housing for rotation, wherein a rotation of the grip in a first direction rotates the second gear and, in turn, the first gear moves so that the first compression spring compresses further to provide haptic resistance to an operator, wherein the first gear includes a ridge extending into an interior channel of the first gear, the ridge having an inner width less than an outer width of the first compression spring to allow the first compression spring to act on the first gear until the first compression spring banks against the ridge.

5. The electronic throttle assembly of claim 4, wherein the inner width is less than an outer width of the second compression spring to allow the second compression spring to act on the first gear until the second compression spring bank against the ridge.

6. The electronic throttle assembly of claim 4 further comprising:
   a rod mounted in the interior upon and extending partially into the first compression spring and second compression springs; and
   a spring stop fixed to the rod at a location between the first and second springs,
   wherein the first and second compression springs are separated by the spring stop and retained within the housing such that the first and second compression springs are normally in a preloaded state with the first compression spring banking against the spring stop in a normal position.

7. The electronic throttle assembly of claim 4, wherein compression of the second compression spring from rest, due to a rotation of the grip in a second direction opposite to the first direction, provides tactile feedback to the operator via a resistive force.

8. The electronic throttle assembly of claim 7, wherein the difference in compressive force between the compressed state of the first and second compression springs encourages the return of the first and second compression springs to the normal position once the operator diminishes torqueing force rotating the grip.

9. The electronic throttle assembly of claim 4, wherein aft rotation of the grip results in the first end of the first gear moving toward the housing, and maximal forward rotation of the grip results in the second end of the first gear moving toward the housing.

10. The electronic throttle assembly of claim 4, wherein the first gear moves linearly or along an arc.

11. An electronic throttle control assembly of a vehicle comprising:
    a) a housing defining an interior;
    b) a first gear movably mounted in the interior wherein the first gear has a first end and a second end;
    c) a second gear in the interior and in contact with the first gear such that the first gear moves in a linear or translational direction upon a rotation of the second gear;
    d) a sensor target coupled to the first gear for movement therewith;
    e) a sensor for generating an electric signal for a vehicle control unit based on a position of the sensor target;
    f) a first compression spring mounted in the interior of the housing and extending between the housing and the first end of the first gear;
    g) a second compression spring mounted in the interior and extending between the housing and the second end of the first gear;
    h) a rod mounted in the interior upon and extending partially into the first compression spring and second compression spring;
    i) a grip coupled to the second gear, wherein a rotation of the grip in a first direction simultaneously rotates the second gear and, in turn, moves the first gear and the sensor target in a linear or translational direction so that the electric signal varies based on change in position of the sensor target; and j) a spring stop coupled to the rod, wherein the first and second compression springs are separated by the spring stop and retained within the housing such that the first and second compression springs are normally in a preloaded state between the housing and one of the first gear or spring stop, wherein movement of the first gear causes the first gear to compress one of the first and second compression spring, so that the one of the first and second compression springs that is compressed provides haptic resistance to an operator.

12. The electronic throttle control assembly of claim 11, wherein the first gear includes a ridge that allows the first and second compression springs to act on the first gear.

13. The electronic throttle control assembly of claim 12, wherein the ridge includes an inner width that is less than an outer width of the first and second compression springs.

14. The electronic throttle control assembly of claim 11, wherein aft rotation of the grip results in the first end of the first gear moving toward the housing, and forward rotation of the grip results in the second end of the first gear moving toward the housing.

15. The electronic throttle control assembly of claim 11, wherein after compression of the first or second compression spring by a torqueing force from the operator rotating the grip, a compressive force from the compressed spring of the first or second compression springs encourages the return of the first gear to the normal position once the operator diminishes or removes the torqueing force.

16. The electronic throttle control assembly of claim 11, wherein compression of the second compression spring from rest, due to a rotation of the grip in a second direction opposite to the first direction, provides tactile feedback to the operator via a resistive force and when the first gear compresses the first compression spring, the spring stop prevents the second compression spring from acting upon the first gear; and when the first gear compresses the second compression spring, the spring stop prevents the first compression spring from acting upon the first gear.

17. An electronic throttle assembly for a vehicle comprising:
   a) a housing mounted to the vehicle, the housing defining a first compartment and a second compartment;
   b) a first gear movably mounted in the first compartment, wherein the housing acts as a hard stop for movement of the first gear;
   c) a second gear movably mounted in the second compartment and in contact with the first gear such that the first gear moves upon movement of the second gear, wherein the second gear is moved by an operator;
   e) a first spring extending between the housing and the first gear, wherein the first spring acts on the first gear to provide a bias to a normal position; and
   f) a grip coupled to the second gear, wherein movement of the grip in a first direction by the operator moves the second gear and, in turn, the first gear moves so that the first spring provides haptic resistance to the operator.

18. The electronic throttle assembly of claim 17, further comprising:
   a rod mounted to the housing and configured to act as a guide for the first spring; and
   a spring stop fixed to the rod, wherein the first spring is banked against the spring stop in a preloaded state in the normal position.

19. The electronic throttle assembly of claim 18, wherein the spring stop is selectively positioned to the rod so that the operator can vary the preloaded state.

* * * * *